United States Patent

Koroschetz et al.

[11] Patent Number: 5,601,371
[45] Date of Patent: Feb. 11, 1997

[54] SLIDING SURFACE BEARING

[75] Inventors: Franz Koroschetz, Gmunden; Erich Pühringer, Oberweis, both of Austria

[73] Assignee: MIBA Gleitlager Aktiengesellschaft, Laakirchen, Austria

[21] Appl. No.: 384,767

[22] Filed: Feb. 7, 1995

[30] Foreign Application Priority Data

Feb. 21, 1994 [AT] Austria ................................. A 342/94

[51] Int. Cl.$^6$ .................................................. F16C 33/12
[52] U.S. Cl. ........................................... 384/276; 384/912
[58] Field of Search ................... 384/276, 294, 384/280, 492, 625, 907, 912, 913

[56] References Cited

U.S. PATENT DOCUMENTS

| | | | |
|---|---|---|---|
| 2,741,016 | 4/1956 | Roach | 384/912 X |
| 3,652,344 | 3/1972 | Kingsbury et al. | 384/912 X |
| 4,452,866 | 6/1984 | Kamiya et al. | 384/913 X |
| 4,789,607 | 12/1988 | Fujita et al. | 364/912 X |
| 4,836,695 | 6/1989 | Baureis et al. | 384/276 |
| 4,957,822 | 9/1990 | Steeg et al. | 384/912 X |

FOREIGN PATENT DOCUMENTS

| | | |
|---|---|---|
| 55-14305 | 1/1980 | Japan . |
| 55-14823 | 2/1980 | Japan . |
| 62-224722 | 10/1987 | Japan . |
| 63-6215 | 1/1988 | Japan . |
| 2-66317 | 3/1990 | Japan . |
| 2239059 | 6/1991 | United Kingdom ............. 384/913 |
| 2218752 | 2/1992 | United Kingdom . |
| 2220993 | 7/1992 | United Kingdom . |

*Primary Examiner*—Thomas R. Hannon
*Attorney, Agent, or Firm*—Collard & Roe, P.C.

[57] ABSTRACT

A sliding surface bearing comprising a backing shell and a roll-clad sliding surface layer consisting of an aluminum alloy containing dispersed soft interstitial elements has an improved fatigue strength because the sliding surface layer is provided on a layer consisting of a precipitation-hardenable or precipitation-hardened aluminum alloy.

4 Claims, 1 Drawing Sheet

SLIDING SURFACE BEARING

BACKGROUND OF THE INVENTION

1. Field of the Invention

This invention relates to a sliding surface bearing comprising a backing shell and a roll-clad sliding surface layer consisting of an aluminum alloy comprising dispersed soft interstitial elements.

2. Description of the Prior Art

Because sliding surface layers consisting of an aluminum alloy comprising dispersed soft interstitial elements cannot be roll-clad with a sufficient adhesion to a backing shell of steel, the sliding surface layer is first bonded by a rolling operation to a foil of commercially pure aluminum and that multilayer composite is then clad onto the backing shell. Whereas the interlayer consisting of the aluminum foil constitutes a suitable primer, such roll-clad bearings have a relatively low fatigue strength. This is due in the first place to the material properties of the aluminum interlayer and in the second place to the fact that the thickness of the sliding surface layer must be sufficient to provide a specified wear allowance because the aluminum interlayer does not even have emergency running properties.

To improve the fatigue strength of sliding surface bearings of the kind described first hereinbefore it would be obvious to provide an interlayer which rather than of commercially pure aluminum consists of a material having a higher strength, such as a foil of AlCu1Ni0.5. But experiments made with such foils have shown that the cold-working involved in roll-cladding results in an increase in strength and in an embrittlement of such aluminum foil, which is solid solution-hardened so that cracks are formed by which the adhesion is adversely be affected.

SUMMARY OF THE INVENTION

For this reason it is an object of the invention to provide a sliding surface bearing which is of the kind described first hereinbefore and is so designed that the fatigue strength can be increased.

The object set forth is accomplished by the invention in that the sliding surface layer has been applied to a layer consisting of a precipitation-hardenable or precipitation-hardened aluminum alloy.

Whereas even in a soft-annealed state, precipitation-hardenable aluminum alloys are harder than solid solution-hardened aluminum alloys, such precipitation-hardenable aluminum alloys can surprisingly be roll-clad to aluminum-base sliding surface layers without a risk of a reduction of the adhesion of the sliding surface layer to the backing shell. It is believed that this result may be due to the fact that the cold-working of aluminum alloys which can be precipitation-hardened will result in a much lower embrittlement and strength increase so that a formation of cracks can substantially be precluded. For this reason, foils made of precipitation-hardenable aluminum alloys can be used as a primer between aluminum-base sliding surface layers and backing shells made of steel and this will afford the advantage that such sliding surface bearings have a much higher fatigue strength.

Such precipitation-hardenable aluminum alloys may be precipitation-hardened to have the strength which is required for a backing shell so that such precipitation-hardened aluminum alloys may be used as backing shells, to which the sliding surface layer can be bonded by roll-cladding without a need for an interlayer.

According to a further feature of the invention, particularly desirable conditions for the design will be provided if the precipitation-hardenable or precipitation hardened aluminum alloy has emergency running properties because in that case the sliding surface layer may have a smaller thickness and not need provide for the wear allowance which will be required at the end of the life of the bearing. But it is known that the fatigue strength will be increased by the provision of thinner sliding surface layers. For this reason sliding surface bearings having a particularly favorable fatigue strength can be provided if precipitation-hardenable or precipitation-hardened aluminum alloys having emergency running properties are used because they permit the thickness of the sliding surface layer to be reduced.

DETAILED DESCRIPTION OF THE PREFERRED EMBODIMENTS

Figure 1:
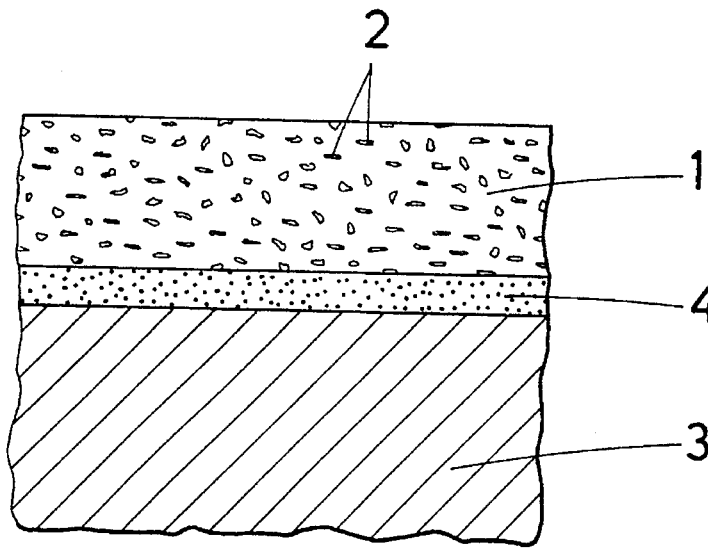
FIG. 1 is a fragmentary sectional view showing a portion of a sliding surface bearing of the prior art as described first hereinbefore.

The invention is illustrated by way of example in the drawing in comparison with the prior art.

According to the prior art illustrated in FIG. 1, a sliding surface layer 1 consisting of an aluminum alloy comprising dispersed soft interstitional elements 2 can be clad to a backing shell 3 of steel because that sliding surface layer consisting, e.g., of AlSn20, is roll-bonded to a pure aluminum foil 4 before the resulting multi-layer composite is clad onto the backing shell 3 made of steel. Because that pure aluminum foil has a hardness of about VHN 28 (0.5 kg) (VHN=Vickers Hardness Number) whereas the sliding surface layer has a hardness of about VHN 35 to 40 (0.5 kg) the fatigue strength of such bearing is necessarily restricted, particularly because the thickness of the sliding surface layer must exceed 0.3 mm to ensure an adequate wear allowance.

Figure 2:
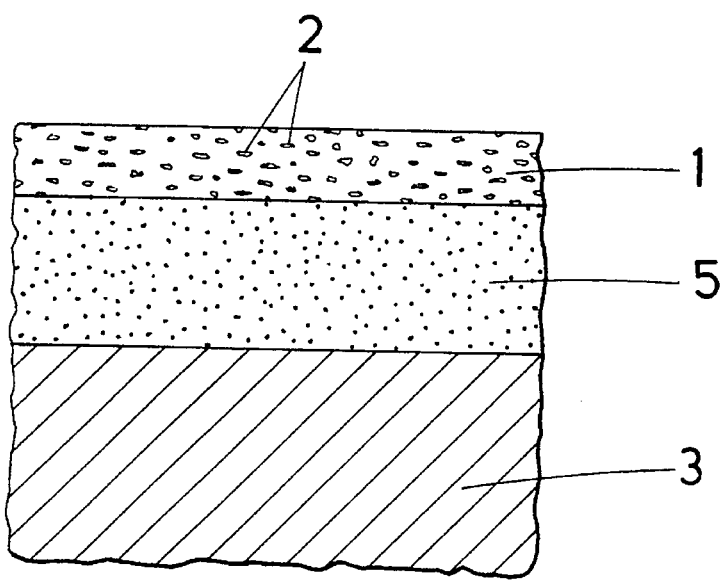
FIG. 2 is a view that is similar to FIG. 1 and snows a sliding surface bearing embodying the invention.
Figure 3:
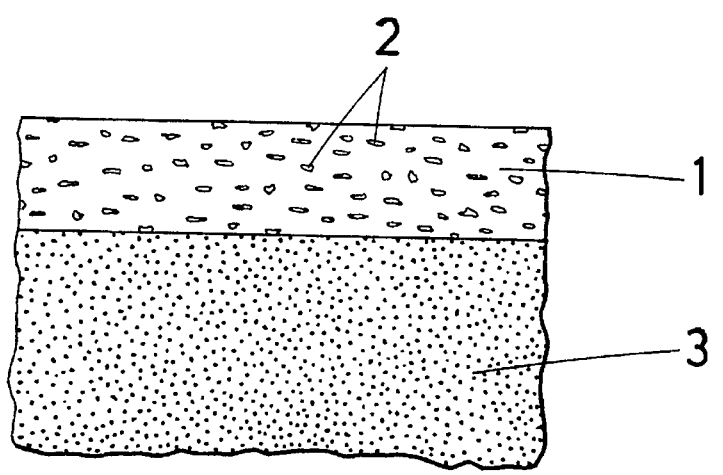
FIG. 3 is a sectional view that is similar to FIG. 2 and shows a modified sliding surface bearing embodying the invention.

In accordance with the invention the sliding surface layer 1 is bonded by roll-cladding either to a precipitation-hardenable aluminum alloy, which constitutes an interlayer 5 between the sliding surface layer 1 and the backing shell 3 of steel, as is shown in FIG. 2 or to a precipitation-hardened aluminum layer, which constitutes the backing shell 3, as is illustrated in FIG. 3. Whereas it was to be expected that the fatigue strength of the sliding surface bearing can be improved by a harder interlayer 5, it is surprising to those skilled in that art that the provision of a precipitation-hardenable aluminum alloy will not adversely affect the adhesion of the sliding surface layer to the backing shell 3, as will be the case, e.g., if interlayers made of non-hardenable aluminum layers are provided because cracks will form in that case, although such solid solution-hardened aluminum alloys, such as AlCu1Ni0.5, have a lower hardness than precipitation-hardenable aluminum alloys even if the latter have been soft-annealed. Special advantages will be afforded if the precipitation-hardenable aluminum alloy have emergency running properties, e.g., if they consist of AlZn4SiPb. If the precision-hardenable aluminum alloys have emergency running properties the sliding surface layer 1 will be no longer required to provide a wear allowance so that a thinner sliding surface layer may be used in conjunction with an interlayer 5 having an adequate thickness. In the illustrative embodiment shown in FIG. 2 the interlayer 5 had a thickness of 0.4 mm and the sliding surface layer had a thickness of 0.2 mm. If the interlayer 5 consists of an alloy AlZn4SiPb it will have a hardness of about VHN 60 (0.5 kg) and may be combined with a sliding surface layer consisting of AlSn20Cu and having a hardness of about VHN 35 to 40 (0.5 kg). The fact that the hardness consistently increases from the sliding surface layer 1 via the interlayer 5 to the backing shell 3 has a desirable influence on the fatigue strength and, as a result, on the load-carrying capacity and life of the sliding surface bearing.

As is apparent from FIG. 3 the precipitation-hardenable aluminum alloy may be precipitation-hardened and in that case may constitute a backing shell, on which the sliding surface layer 1 is carried without an interlayer.

It will be understood that the invention is not restricted to the illustrative embodiments shown. For instance, the sliding surface layer might consist of suitable aluminum alloys having soft inclusions consisting of Sn, Pb or Bi. Precipitation-hardenable aluminum alloys which can be roll-clad to an aluminum-base sliding surface layer may consist of AlZn4SiPb of particularly of AlZn 4.5 Mg, AlSi11CuMgNi or AlMgSi1.

We claim:

1. In a sliding surface bearing comprising a back shell and a roll-clad sliding surface layer consisting of an aluminum alloy comprising dispersed soft interstitial elements, the improvement comprising a layer underlying said sliding surface layer, the underlying layer consisting of an aluminum alloy selected from the group consisting of precipitation-hardenable aluminum alloys and precipitation-hardened aluminum alloys, and the underlying layer having a greater hardness than the sliding surface layer.

2. The improvement set forth in claim 1, wherein an interlayer consisting of a precipitation-hardenable aluminum alloy is provided between said sliding surface layer and said backing shell.

3. The improvement set forth in claim 1, wherein said backing shell consists of a precipitation-hardened aluminum alloy layer.

4. The improvement set forth in claim 1, wherein said sliding surface layer is provided on a layer having emergency running properties and consisting of an aluminum alloy selected from the group consisting of the precipitation-hardenable aluminum alloys and precipitation-hardenable aluminum alloys.

\* \* \* \* \*